(12) United States Patent
Kashima et al.

(10) Patent No.: US 7,957,430 B2
(45) Date of Patent: Jun. 7, 2011

(54) FLEXIBLE SEGMENTATION SCHEME FOR COMMUNICATION SYSTEMS

(75) Inventors: Tsuyoshi Kashima, Yokohama (JP); Mika Rinne, Espoo (FI); Jukka Ranta, Kaarina (FI); Paivi Purovesi, Espoo (FI)

(73) Assignee: Nokia Corporation, Espoo (FI)

( * ) Notice: Subject to any disclaimer, the term of this patent is extended or adjusted under 35 U.S.C. 154(b) by 641 days.

(21) Appl. No.: 11/649,633

(22) Filed: Jan. 4, 2007

(65) Prior Publication Data

US 2008/0009289 A1    Jan. 10, 2008

Related U.S. Application Data

(60) Provisional application No. 60/756,919, filed on Jan. 5, 2006.

(51) Int. Cl.
*H04J 99/00* (2009.01)
(52) U.S. Cl. ......... 370/916; 370/229; 370/912; 370/914
(58) Field of Classification Search .......... 370/229, 370/901, 908, 912, 914, 916, 282
See application file for complete search history.

(56) References Cited

U.S. PATENT DOCUMENTS

| | | | | |
|---|---|---|---|---|
| 4,691,314 | A * | 9/1987 | Bergins et al. | 370/471 |
| 5,425,028 | A * | 6/1995 | Britton et al. | 370/389 |
| 5,541,922 | A * | 7/1996 | Pyhalammi | 370/462 |
| 6,279,041 | B1 * | 8/2001 | Baber et al. | 709/232 |
| 6,810,021 | B1 * | 10/2004 | Sakurai | 370/255 |
| 6,819,658 | B1 * | 11/2004 | Agarwal et al. | 370/316 |
| 7,826,457 | B2 * | 11/2010 | Bennett et al. | 370/394 |
| 2001/0022806 | A1 * | 9/2001 | Adachi | 375/133 |
| 2002/0071434 | A1 * | 6/2002 | Furukawa | 370/392 |
| 2002/0087716 | A1 * | 7/2002 | Mustafa | 709/236 |
| 2003/0021240 | A1 * | 1/2003 | Moon et al. | 370/320 |
| 2003/0076870 | A1 * | 4/2003 | Moon et al. | 375/130 |
| 2003/0152083 | A1 * | 8/2003 | Nagata et al. | 370/395.4 |
| 2004/0179486 | A1 * | 9/2004 | Agarwal et al. | 370/316 |

(Continued)

FOREIGN PATENT DOCUMENTS

EP    1209936 A    5/2002

(Continued)

OTHER PUBLICATIONS

"Node-B Packet Scheduling for LTE" (R2-052892), 3GPP TSG-RAN WG2 Meeting #49, Seoul, South Korea, Nov. 7-11, 2005.

(Continued)

*Primary Examiner* — Kent Chang
*Assistant Examiner* — Ronald Eisner
(74) *Attorney, Agent, or Firm* — Harrington & Smith

(57) ABSTRACT

Methods, computer program products, electronic devices and information blocks are provided that improve both efficiency of transmission and efficiency of segmentation by enabling an intelligent transport block size determination and a flexible segmentation scheme suitable for utilization with retransmission. One exemplary method involves steps of: determining a size of a transport block based on criteria including a size of at least one data block to be transmitted, wherein the transport block size is determined such that the transport block will include at least one segment of a data block of the at least one data block; segmenting the data block of the at least one data block into a plurality of segments including the at least one segment; and populating the transport block with at least the at least one segment.

26 Claims, 14 Drawing Sheets

U.S. PATENT DOCUMENTS

| | | | | |
|---|---|---|---|---|
| 2005/0120124 A1* | 6/2005 | Korhonen | | 709/231 |
| 2005/0152397 A1* | 7/2005 | Bai et al. | | 370/468 |
| 2005/0266846 A1 | 12/2005 | Kim | | |
| 2007/0242636 A1* | 10/2007 | Kashima et al. | | 370/329 |
| 2007/0248025 A1* | 10/2007 | Phan et al. | | 370/252 |

FOREIGN PATENT DOCUMENTS

| | | |
|---|---|---|
| WO | WO-92-05556 A1 | 4/1992 |
| WO | WO 01/52565 A2 | 7/2001 |
| WO | WO-02-37789 A2 | 5/2002 |

OTHER PUBLICATIONS

Panasonic: LTE—Layer 2 protocol functions 3GPP Draft; R2-015882, $3^{rd}$ Generation Partnership Project (3GPP), Mobile Competence Centre; 650 Route Des Lucioles; F-06921 Sophia—Antipolis Cedex; France, vol. RAN WG2, no London, UK, Aug. 26, 2005, XP050129035 (retrieved on Aug. 26, 2005).

Nokia: "PDCP/RLC/MAC PDU Structure" 3GPP Draft; R2-062754 DCP RLC MAC, $3^{rd}$ Generation Partnership Project (3GPP), Mobile Competence Centre; 650, Route Des Lucioles; F-06921 Sophia—Antipolis Cedex; France, vol. RAN WG2, No. Seoul, Korea; Oct. 5, 2006, XP050132287 (retrieved Oct. 5, 2006).

Nokia: "Segmentation in E-UTRAN" 3GPP Draft; R2-060827 Segementation in E-UTAN, $3^{rd}$ Generation Partnership Project (3GPP), Mobile Competence Center; 650, Route Des Lucioles; F-06921 Sophia—Antipolis Cedex; France, vol. RAN WG2, No. Athens, Greece; Mar. 23, 2006 XP050130773 (retrieved on Mar. 23, 2006).

* cited by examiner

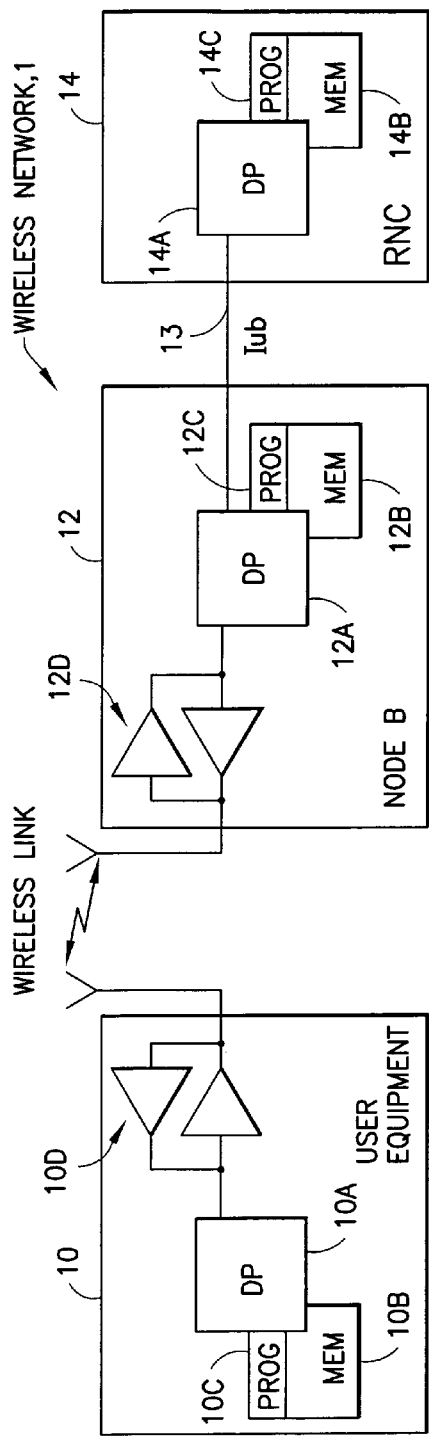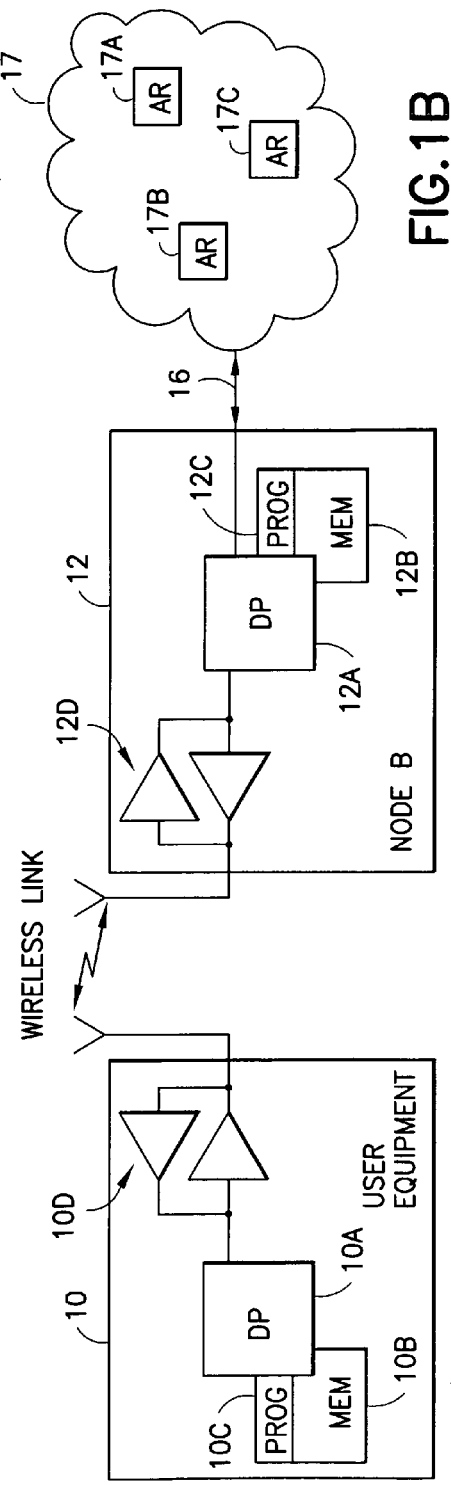

FLEXIBLE SEGMENTATION SCHEME FOR COMMUNICATION SYSTEMS

CROSS-REFERENCE TO RELATED APPLICATIONS

This patent application claims priority under 35 U.S.C. §119(e) from Provisional Patent Application No. 60/756,919, filed Jan. 5, 2006, the disclosure of which is incorporated by reference herein in its entirety.

TECHNICAL FIELD

The exemplary and non-limiting embodiments of this invention relate generally to wireless communication systems and, more specifically, relate to segmentation schemes.

BACKGROUND

The following abbreviations are herewith defined:
3G Third Generation Mobile Network
AR access router
ARQ automatic repeat request
BS base station (also referred to as a Node B)
E-UTRAN Evolved Universal Terrestrial Radio Access Network
HSDPA High Speed Downlink Packet Access
IP internet protocol
L1 Layer 1 (Physical Layer)
L2 Layer 2 (MAC Layer)
LCID logical channel identity
MAC Medium Access Control Layer (L2)
PHY Physical Layer (L1)
PDU protocol data unit
QoS quality of service
RNC radio network controller
SDU service data unit
SSN service data unit (SDU) sequence number
TB transport block
TCP transmission control protocol
UDP user datagram protocol
UE user equipment
UL uplink
UTRAN Universal Terrestrial Radio Access Network
VoIP voice over internet protocol
WCDMA Wide-Band Code-Division Multiple Access
WLAN wireless local area network In E-UTRAN, application flows with different QoS requirements are served over the wireless path by different logical channels in the MAC protocol layer. MAC SDUs, which are higher layer packets such as IP packets, are queued in priority queues, which are arranged for the logical channels. The amount of data to be transmitted for each logical channel is determined for every radio frame transmission, attempting to meet the QoS requirements of each IP traffic flow. Then, for each UE, MAC multiplexes (concatenates) the scheduled data from the priority queues into one TB. In this process, MAC may need to segment MAC SDUs to make them fit into the TB. After triggering TBs from MAC, PHY multiplexes TBs from different LJEs into a radio frame.

In prior art cellular systems (e.g., 3G), the SDUs are segmented and concatenated to constant size PDUs, which are defined per transport channel. This adds segmentation and multiplexing overhead. The reasoning is that the transmission capacity of a radio link varies in time and small payloads are often available. Thus the constant size PDU typically needs to be small. A small PDU fits well with the small rate channels, but will cause a lot of overhead when segmenting large SDUs into the small PDUs. On the other hand, many small PDUs need to be created for the high rate channels, which will cause multiplexing overhead. Optimally, the PDU size would be modified depending on the capabilities of the transport channel and its temporary conditions. However, modification of the PDU size, in 3G, requires a heavy peer-to-peer procedure and re-segmentation. Hence, it is typically not preferred.

In prior art wireless systems (e.g., WLAN), SDUs are transmitted as full packets. The multiple access is based on random access/collision detection in uplink and scheduling in downlink. Thus, once a transmission resource is indicated for a given user, it is allowed to use the full bandwidth for a short period of time as required for the transmission of the entire SDU available. In such a manner, there is less segmentation and multiplexing overhead. However, large expected multi-user multiplexing gains will not be available.

The problems of these prior art segmentation schemes are even more evident in newer cellular and wireless systems, where the available bandwidth is large, bandwidth flexibility is large and the symbol rate is high, but varying radio conditions impose receiver-dependent and time/frequency-dependent characteristics on the transmission of each radio link. On the other hand, for any receiver, gains available by frequency scheduling, gains available by exploiting the frequency diversity present in the channel and gains available by adaptive transmission bandwidth selection are significant. Yet, multi-user gains, which are realized by allocating independent radio links efficiently in time and frequency are significant as well. Thus, the segmentation scheme should be flexible and efficient to allow usage of any of these kinds of transmission techniques. Neither of the mentioned prior art schemes, i.e. a fixed PDU size and a trivial segmentation scheme, can efficiently meet these contradictory requirements. In such conditions, full SDU transmissions are feasible and generally preferred for low overhead. However, segmentation may still be necessary for large SDUs to be received on difficult low bit-rate radio links.

In conventional segmentation approaches for WCDMA and HSDPA, segmentation is performed before a TB size is decided. Hence, the system can only deliver fixed size or at least ready-made segments and thus has to concatenate segments to fill the TB efficiently. This increases the amount of headers and complicates the procedure by trying to match segments to the tail of the TB.

In another prior art segmentation scheme, SDU retransmissions using the SSN is employed. However, full SDU retransmission is generally inefficient and may lead to problems in low bit-rate radio link conditions. The efficiency also depends on the traffic class and the size distribution of data. If the application generates large TCP/UDP segments in the IP packets and the system bandwidth is narrow, one SDU must be segmented into many small segments. For example, the maximum transmission unit (MTU) or maximum segment size (MSS) for an IP packet over Ethernet is typically 1500 bytes, and one sub-frame over a 1.25 MHz system with ½-coding rate and Quadrature Phase Shift Keying (QPSK) modulation only has about 450 information bits. This means that, for this system, one SDU will be segmented into 28 segments, thus increasing the probability of SDU error. A large SDU in such a system would likely be re-transmitted one or more times. Not only will the throughput of the radio link be significantly reduced but, in addition, the cell throughput will be reduced since retransmissions are typically prioritized.

SUMMARY

In an exemplary aspect of the invention, a method is provided. The method includes: determining a size of a transport block based on criteria including a size of at least one data block to be transmitted, wherein the transport block size is determined such that the transport block will include at least one segment of a data block of the at least one data block; segmenting the data block of the at least one data block into a plurality of segments including the at least one segment; and populating the transport block with at least the at least one segment.

In another exemplary aspect of the invention, a computer program product is provided. The computer program product includes program instructions embodied on a tangible computer-readable medium. Execution of the program instructions results in operations including: determining a size of a transport block based on criteria including a size of at least one data block to be transmitted, wherein the transport block size is determined such that the transport block will include at least one segment of a data block of the at least one data block; segmenting the data block of the at least one data block into a plurality of segments including the at least one segment; and populating the transport block with at least the at least one segment.

In a further exemplary aspect of the invention, another method is provided. The method includes: segmenting a data block into a plurality of segments, wherein each segment of the plurality of segments has a data block identifier, a length value and an offset value, wherein the data block identifier has an identification of the segmented data block, wherein the length value has the length of the segment, wherein the offset value has the boundary of the segment as compared to the segmented data block, wherein the segmented data block is to be transported by a plurality of transport blocks; populating a transport block of the plurality of transport blocks with at least one segment of the plurality of segments; and in response to receiving a retransmission notice indicating a segment of the plurality of segments, retransmitting the indicated segment, wherein the retransmission notice includes the data block identifier, the length value and the offset value of the indicated segment.

In another exemplary a computer program product is provided. The computer program product includes program instructions embodied on a tangible computer-readable medium. Execution of the program instructions results in operations including: segmenting a data block into a plurality of segments, wherein each segment of the plurality of segments has a data block identifier, a length value and an offset value, wherein the data block identifier has an identification of the segmented data block, wherein the length value has the length of the segment, wherein the offset value has the boundary of the segment as compared to the segmented data block, wherein the segmented data block is to be transported by a plurality of transport blocks; populating a transport block of the plurality of transport blocks with at least one segment of the plurality of segments; and in response to receiving a retransmission notice indicating a segment of the plurality of segments, retransmitting the indicated segment, wherein the retransmission notice includes the data block identifier, the length value and the offset value of the indicated segment.

In a further exemplary aspect of the invention, an electronic device is provided. The electronic device includes: a memory configured to store at least one data block to be transmitted by a transport block; and a data processor coupled to the memory, wherein the data processor is configured to perform operations including: determining a size of the transport block based on criteria including a size of a data block of the at least one data block, wherein the transport block size is determined such that the transport block will include at least one segment of the data block; segmenting the data block into a plurality of segments including the at least one segment; and populating the transport block with at least the at least one segment and the at least one full data block.

In another exemplary aspect of the invention, an information block is provided. The information block is to be transmitted from a first node to a second node and is stored on a tangible computer-readable medium prior to transmission. The information block includes: a portion of a data block, wherein the portion of the data block does not include the complete data block; a data block identifier having an identification of the data block; a length value having a size of the portion of the data block; and an offset value having a boundary of the portion of the data block as compared to the complete data block.

In a further exemplary aspect of the invention, an electronic device is provided. The electronic device includes: a data processor; and a transmitter coupled to the data processor. The transmitter is configured to transmit a retransmission notice indicating a segment of a plurality of segments. The retransmission notice includes a request for retransmission of the indicated segment. The plurality of segments include a segmented data block. The retransmission notice has a data block identifier, a length value and an offset value of the indicated segment. The data block identifier has an identification of the segmented data block. The length value has a length of the indicated segment. The offset value has a boundary of the indicated segment as compared to the segmented data block.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1A shows a simplified block diagram of various electronic devices, as connected to a wireless network, that are suitable for use in practicing the exemplary embodiments of this invention;

FIG. 1B shows a simplified block diagram of various electronic devices, as connected to a base station that is itself connected to a network with one or more access routers, that are suitable for use in practicing the exemplary embodiments of this invention;

DETAILED DESCRIPTION

Figure 2:
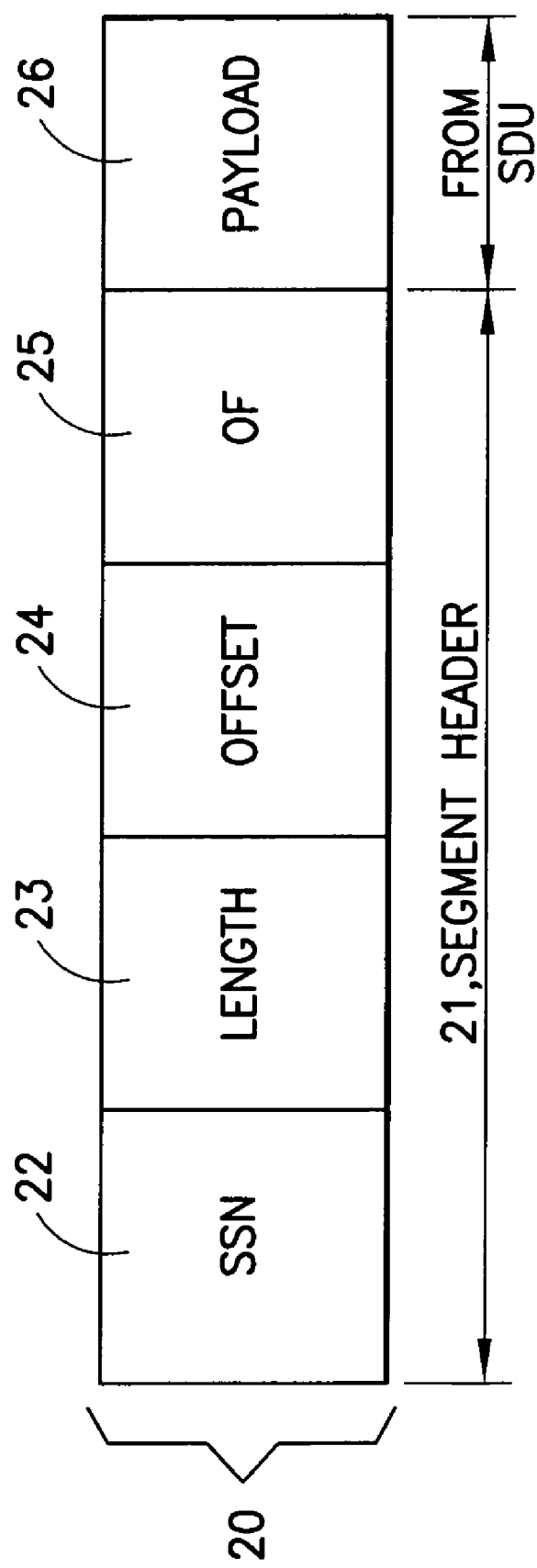
FIG. 2 illustrates an exemplary segment structure of a segment as employed by exemplary embodiments of this invention.

Exemplary embodiments of the invention improve both the efficiency of the transmission and the efficiency of the segmentation by providing an intelligent TB size determination method and a flexible segmentation scheme for retransmission. The description focuses on downlink transmission and is primarily for the BSs, although these serve as non-limiting exemplary embodiments of the invention. Additional non-limiting exemplary embodiments of the invention include respective applications of the method to a UE and UL transmission. In the downlink transmission exemplary, the receiver functionality is in the UE. In the uplink transmission exemplary, the receiver functionality is in the BS. Note that this invention can be applied to any protocol layer that has segmentation and retransmission functionalities. As a non-limiting example, it may be applied to the L1/L2 interface for E-UTRAN.

Reference is made first to FIG. 1A for illustrating a simplified block diagram of various electronic devices that are suitable for use in practicing the exemplary embodiments of this invention. In FIG. 1A, a wireless network 1 is adapted for communication with a UE 10 via a Node B (base station) 12. The network 1 may include a RNC 14, which may be referred to as a serving RNC (SRNC). The UE 10 includes a data processor (DP) 10A, a memory (MEM) 10B that stores a program (PROG) 10C, and a suitable RF transceiver 10D (having a transmitter (TX) and a receiver (RX)) for bidirectional wireless communications with the Node B 12, which also includes a DP 12A, a MEM 12B that stores a PROG 12C, and a suitable RF transceiver 12D. The Node B 12 is coupled via a data path 13 (Iub) to the RNC 14 that also includes a DP 14A and a MEM 14B storing an associated PROG 14C. The RNC 14 may be coupled to another RNC (not shown) by another data path 15 (Iur). At least one of the PROGs 10C, 12C and 14C is assumed to include program instructions that, when executed by the associated DP, enable the electronic device to operate in accordance with the exemplary embodiments of this invention, as will be discussed below in greater detail.

FIG. 1B shows a simplified block diagram of various electronic devices that are suitable for use in practicing the exemplary embodiments of this invention. As in FIG. 1A, FIG. 1B depicts a wireless network adapted for communication with a UE 10 via a Node B (base station) 12. The UE 10 includes a data processor (DP) 10A, a memory (MEM) 10B that stores a program (PROG) 10C, and a suitable RF transceiver 10D (having a transmitter (TX) and a receiver (RX)) for bidirectional wireless communications with the Node B 12, which also includes a DP 12A, a MEM 12B that stores a PROG 12C, and a suitable RF transceiver 12D. The Node B 12 is coupled via a data path 16 to a network 17. The network 17 contains one or more access routers (AR) 17A, 17B, and 17C to facilitate the connection with Node B 12. At least one of the PROGs 10C and 12C is assumed to include program instructions that, when executed by the associated DP, enable the electronic device to operate in accordance with the exemplary embodiments of this invention, as will be discussed below in greater detail.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 10A of the UE 10 and other DPs such as the DP 12A, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs), processors based on a multi-core processor architecture, and Application Specific Integrated Circuits (ASICs), as non-limiting examples.

Exemplary embodiments of this invention provide a TB size determination method that takes the SDU boundaries into account, and a flexible segmentation scheme that allows flexible segment retransmission. According to exemplary embodiments of the invention, TB size is determined taking the SDU boundaries into account and segmentation is performed after the TB size has been determined. Given a TB size and SDU boundaries, the MAC segments MAC SDUs to fit them into the TB by considering the MAC SDU boundary. For example, if the MAC SDU is very small, such as for a VoIP packet, the MAC does not segment the SDU at all. Another non-limiting example of a small MAC SDU is a TCP acknowledgement. In addition, if the remaining part of the SDU is very small, further segmentation is avoided, if possible. As many full, non-segmented SDUs as possible are delivered by each TB. In the remainder of the TB, that is, the portion that cannot be filled by complete SDUs, a sequence of bytes (variable length segments of SDUs) is inserted to fill the TB. Note that the headers, as overhead of the payload, may be subtracted from the variable length SDU size filling the TB exactly.

In relation to the retransmission technique, exemplary embodiments of this invention provide a segment structure using offset and length fields. "Offset" and "length" refer to the starting position of the segment in the original SDU and the length of the segment (e.g., in byte resolution), respectively. The receiver is configured to maintain a receiver window for the full SDUs by having an offset and length signaled for the segments of partially transmitted SDUs. The receiver window indicates which SDUs are missing, which SDUs have been fully received, which SDUs have been partially received, and which part(s) of the SDUs are missing. The partially received SDUs may have one or several segments missing. However, once a later segment is correctly received, the receiver is enabled to track between which offsets it has missing data. In fact, the receiver does not need to know whether the transmitter originally tried to deliver the missing part in one or more segments. When generating an ARQ status report, the receiver calculates the missing data between the received offsets for any partially received SDU. Thus, the retransmission request is indicative of a portion from (offset (early)+length) to offset (late), which is announced as a retransmission request; offset=offset (early+length) and length=offset (late)−(offset (early)+length). After the transmitter receives an ARQ status report or negative-acknowledgements (NACKs), it retransmits missing data for the requested missing full SDUs and for the requested partially missing SDUs. The transmitter may decide to retransmit the full SDU or only the missing segments. Employing the invention's segmentation scheme, the retransmission of missing segments is not bound to the original segment sizes and the transmitter may append them to the TB transmission either in larger numbers of smaller segments or in smaller numbers of larger segments, as compared to the original transmission. This choice may also depend on the TB size, which is determined at the time based on frame scheduling (multi-user scheduling) and logical channel priorities.

As a non-limiting example, one approach that may be utilized in conjunction with the exemplary embodiments of the invention comprises using the segment sequence number to indicate re-numbering of the segments (i.e., the offset value). Generally, using the segment sequence number for retransmission requests independently of aspects of the exemplary embodiments of the invention is not preferred as the segment size may change depending on radio link conditions and their retransmission by segment sequence number would require re-segmentation and re-numbering. However in this case, the segment sequence number (of the re-segmented segment having a re-numbered segment sequence number) may be employed in conjunction with aspects of the exemplary embodiments of the invention, for example, by using the segment sequence number as the offset value comprising a boundary of the indicated segment.

For a large SDU requiring retransmission, the transmitter may simply segment the missing parts of the large SDU and attempt to deliver them again, potentially as a sequence of smaller segments. (Note that re-segmentation is not necessary as the non-segmented full SDUs reside in the priority queues contrary to the prior art.) Such smaller segments would consume marginal capacity from the sub-frame and cell throughput would be maintained by the other served radio links, even if the throughput of that specific radio link appears to drop. Further, it is possible to apply more robust transport formats (low order modulation, low rate channel code, increased diversity mode) to the smaller segments as compared to the transport format selection for larger segments or full SDUs. Note that a retransmission without adapting to smaller segments or a more robust transport format is also feasible and is within the scope of the exemplary embodiments of this invention.

When determining the TB size for each radio link (UE) at a given sub-frame instance, SDU boundaries should be taken into account in addition to other factors such as the expected channel conditions of the radio links, the amount of data to be transmitted from each of the priority queues of the logical channels and the priority of the UEs, as non-limiting examples. The amount of data to be transmitted may be any quantity from the minimum guaranteed data to all available data in the queues. This becomes feasible due to the great degree of freedom that the scheduler and allocation functions have, either to schedule fewer UEs per sub-frame with larger payloads less frequently or to schedule more UEs per sub-frame with smaller payloads more frequently. These choices lead to different gain factors of transmission and different amounts of segmentation and multiplexing overhead.

In exemplary embodiments of the invention, two methods, herein identified as (A) and (B), may be employed when requesting data transmission.

(A) The amount of data to be transmitted for each traffic flow (priority queue) and the MAC SDU boundaries closest to these values are provided. Then, the TB size allocated for each UE is determined by utilizing all available information so that the block size contains SDUs with minimum or no segmentation.

(B) The amount of data to be transmitted from each traffic flow (priority queue), herein referred to as the SDU-aligned data amount, is calculated based on the scheduling decision and is aligned to the SDU boundaries as much as possible. When requesting data transmission, the SDU-aligned data amount is provided.

Using either method, given the information, the block size is determined so that segmentation is avoided as much as possible. However, this is merely a guideline and the block size or requested data size need not always be aligned to the SDU boundaries if, for example, the discrepancy is large.

For method (A) above, a vector comprising the minimum amount of data to be transmitted and MAC SDU boundaries closest to the minimum amount (the elements of which correspond to traffic flows) are provided using the interface. Other parameters, such as priority, may also be provided using the interface.

For method (B) above, a vector of SDU-aligned data amounts (the elements of which correspond to traffic flows) are provided. Other parameters, such as priority, may also be provided using the interface.

Given a TB size, segmentation is performed, when necessary, for packing SDUs into the TB. Each segment comprises the SDU sequence number, length, and partial SDUs, wherein the partial SDUs additionally include the segment offset inside a full SDU. As noted above, "offset" indicates the starting position of the segment in the original SDU and "length" indicates the length of the segment, which may be in byte resolution.

FIG. 2 illustrates an exemplary segment structure of a segment 20. Segment 20 contains a segment header 21 and a payload 26. The segment header 21 comprises the SDU sequence number (SSN) 22, the length value of the segment 23, the offset value 24 (optional), and other fields in the segment header (OF) 25, if necessary. Payload 26 contains information from the SDU.

When retransmission is necessary, the receiver may request the retransmission of a missing SDU by indicating the SSN. The receiver may request the retransmission of a missing part of a SDU by indicating the SSN, offset and length of the missing part. These retransmission requests are signalled in an ARQ status report. When retransmission is requested and the given, new TB size cannot accommodate the original segment size, the transmitter may perform segmentation, to any size, by using the length and offset fields.

Figure 3:
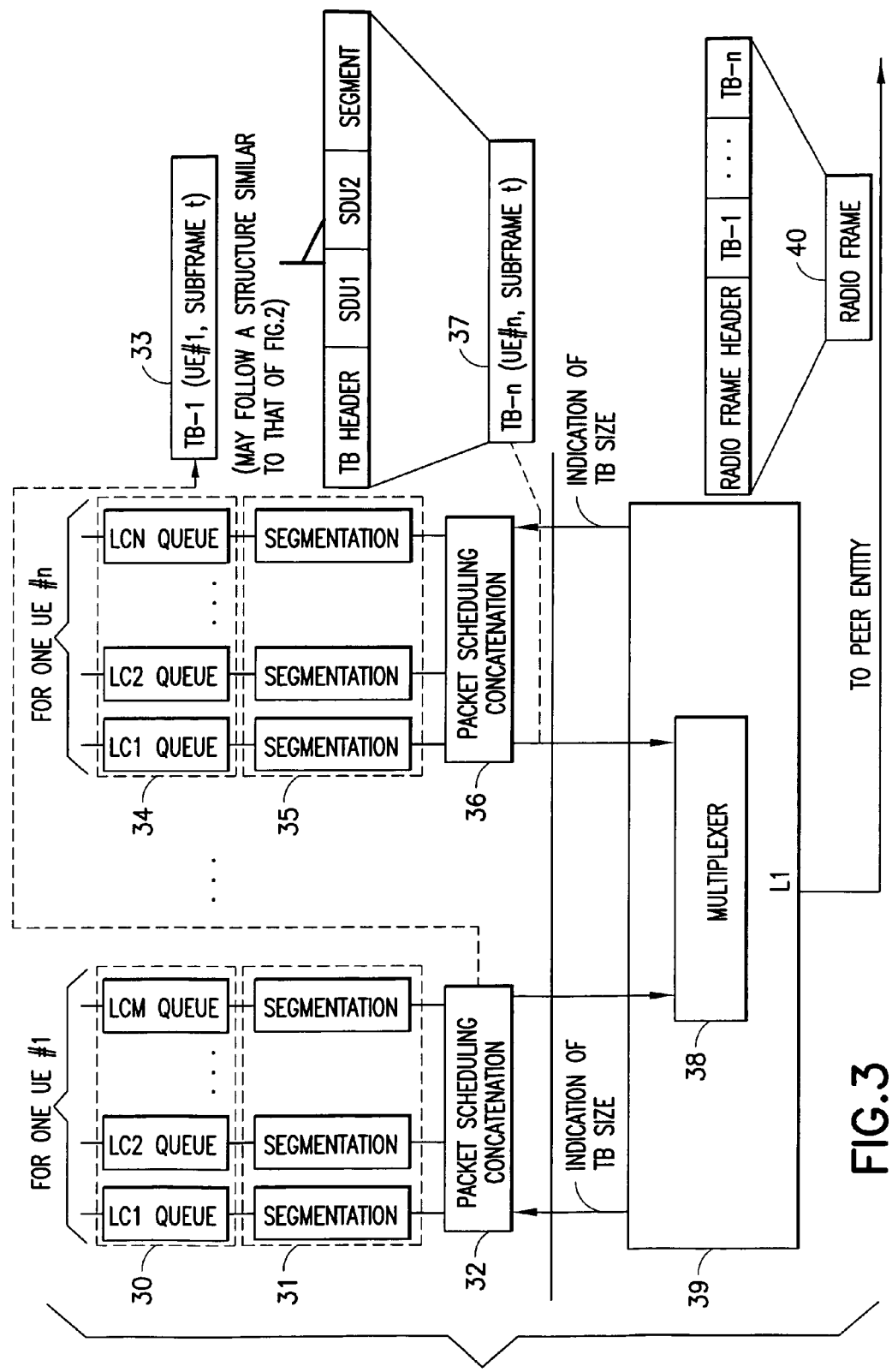
FIG. 3 depicts the data flow for practicing an exemplary embodiment of this invention.

FIG. 3 depicts the data flow. Starting from logical channel queues 30, 34, MAC SDUs are segmented if necessary 31, 35, and multiplexed (concatenated) 32, 36 into a transport block 33, 37 for each UE. Then, TBs 33, 37 are multiplexed 38 into a physical radio frame 40, sent out through L1 39. As illustrated in the figure for TB-n 37, TBs 33, 37 comprise a header with a combination of one or more SDUs, noted in the figure as SDU1 and SDU2, and/or a segment. Radio frame 40 comprises a header with one or more multiplexed TBs, indicated in the figure by TB-1 and TB-n.

Figure 4:
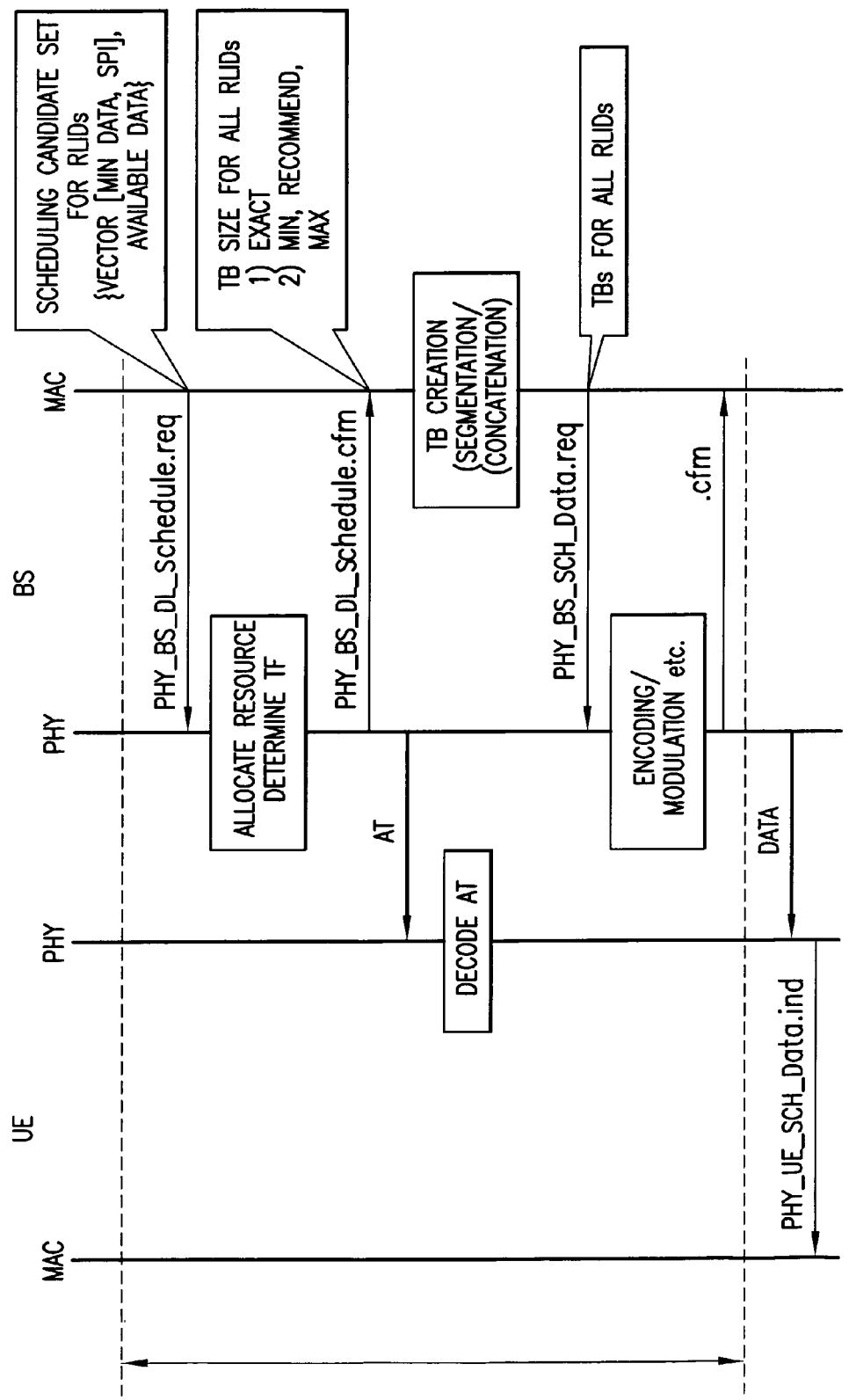
FIG. 4 shows a detailed message signalling chart for downlink data transmission procedures of an exemplary embodiment of this invention.
Figure 5:
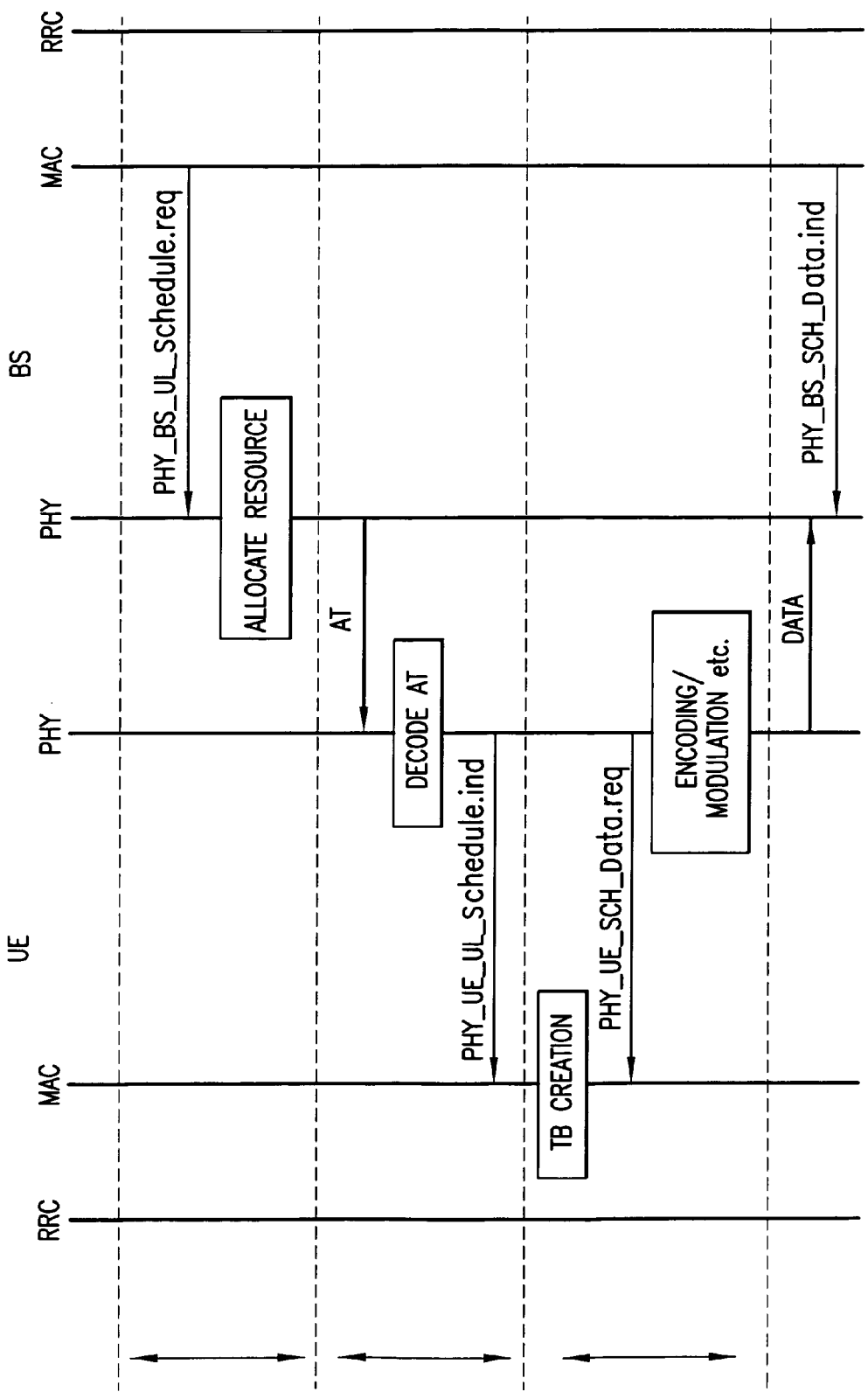
FIG. 5 shows a detailed message signalling chart for uplink data transmission procedures of an exemplary embodiment of this invention.

FIGS. 4 and 5 illustrate detailed message signalling charts for downlink and uplink data transmission procedures, respectively. Depending on the scheduling (e.g., at the MAC layer), the amount of data to be transmitted for each logical channel of each UE is determined. Then, the MAC provides vector information for the data amount (which can be either option (A) or (B) as noted above), each element of which corresponds to each logical channel. In this vector information, the SDU boundaries are taken into account. Then, the allocation unit (e.g., at PHY) determines the TB size by using the given information comprising the data amount and radio link conditions, among other factors, and returns the TB size information to the MAC layer for each of the active radio links. Given the TB size, MAC starts segmentation by taking the SDU boundaries into account. The segment structure can be as shown in FIG. 2. The retransmission (at the MAC layer) can use flexible segment size according to the invention.

For the above signalling procedure, the primitives are defined as follows in Table 1.

TABLE 1

| Generic Name | Parameters | | | |
|---|---|---|---|---|
| | Request | Indication | Response | Confirm |
| PHY_BS_DL_Schedule | Radio link ID, Vector of {minimum data size, SPI} available data size, | | | Radio link ID, TB size |
| PHY_BS_UL_Schedule | Radio link ID, Vector of {minimum data size, SPI} available data size, | | | |
| PHY_UE_UL_Schedule | | TB size | | |

Figure 6:
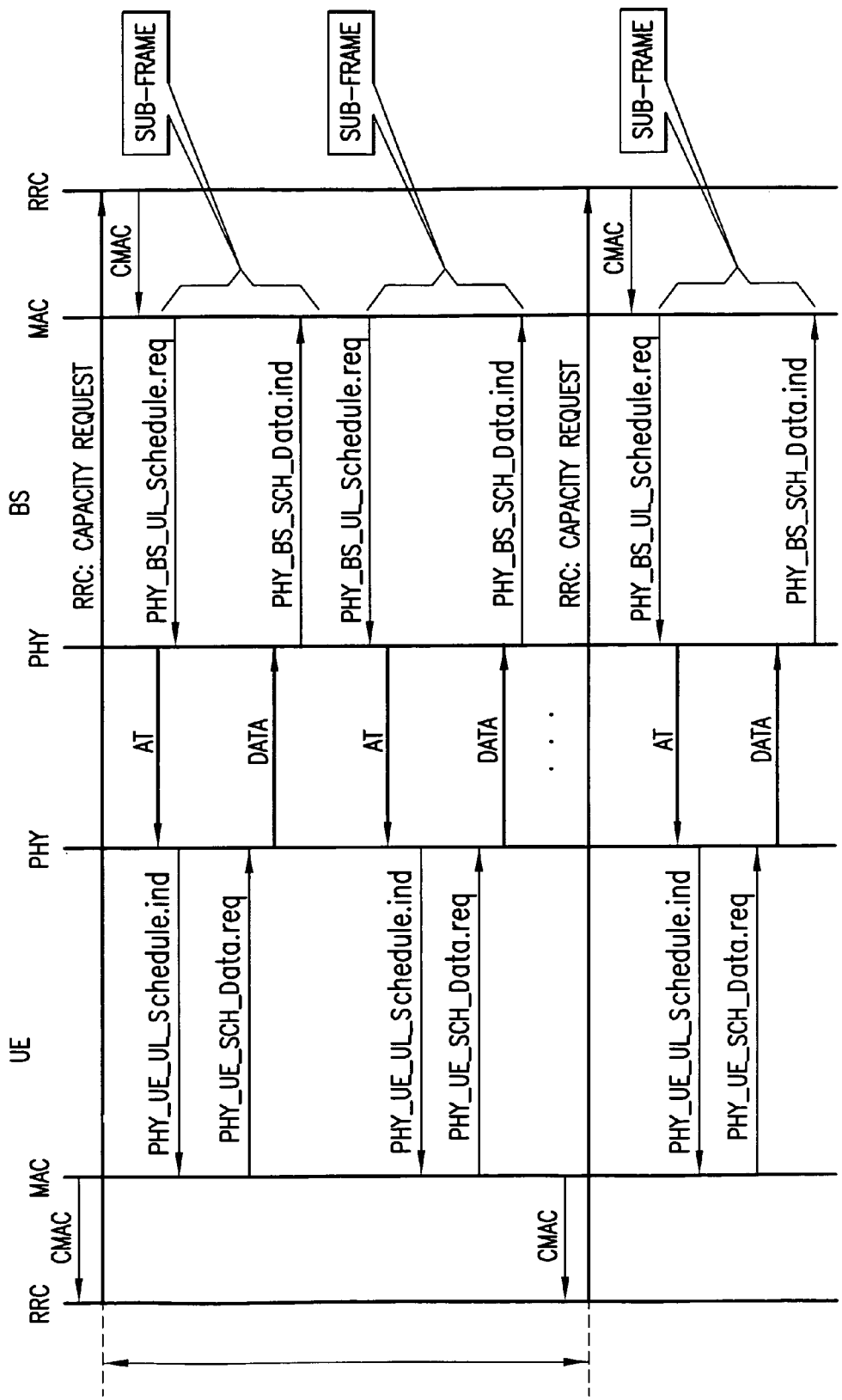
FIG. 6 illustrates a detailed message signaling chart for uplink data transmission procedures of an exemplary embodiment of this invention in a longer time scale than FIG. 5.
Figure 7:
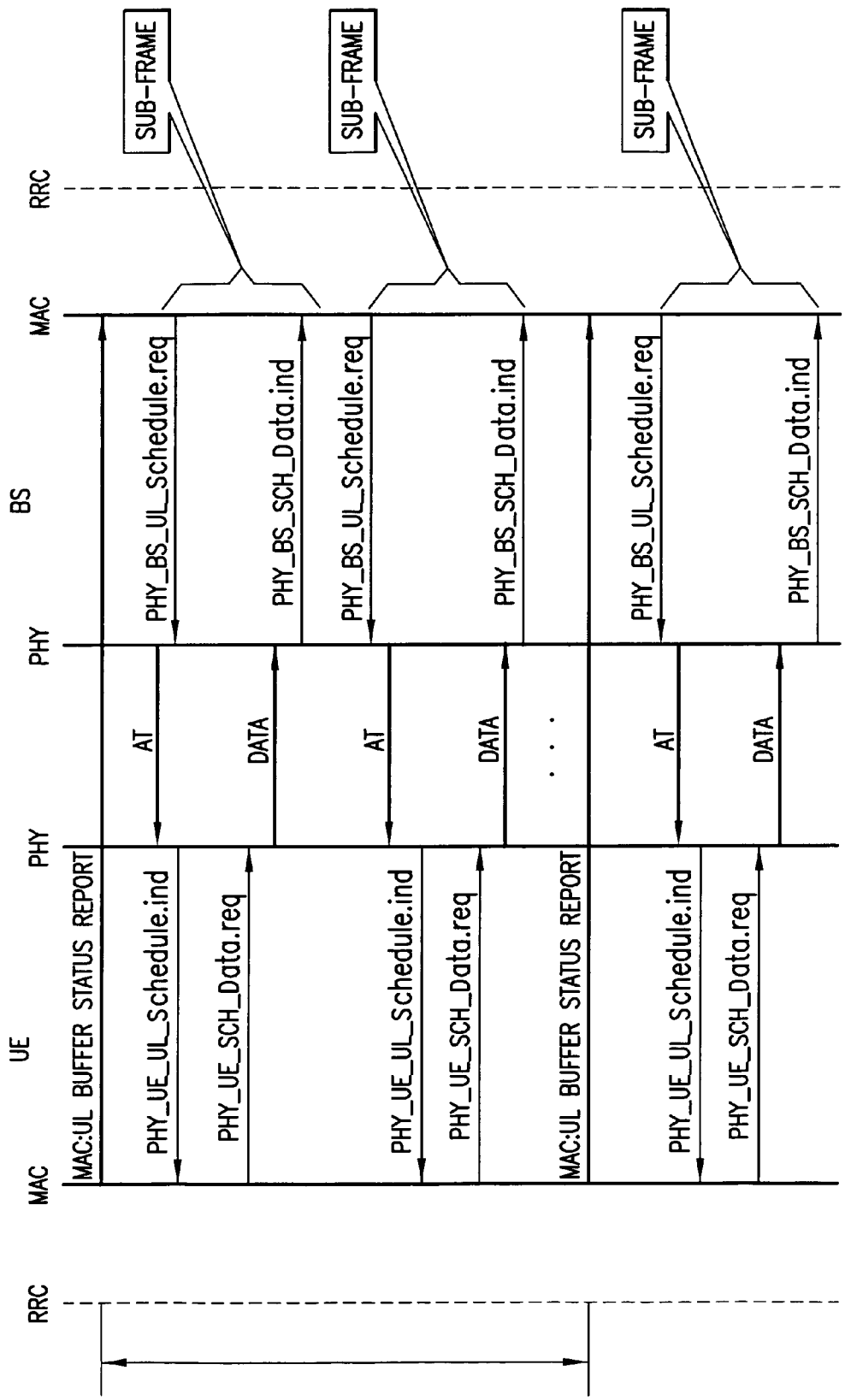
FIG. 7 illustrates a detailed message signaling chart for uplink data transmission procedures of another exemplary embodiment of this invention in a longer time scale than FIG. 5.

FIGS. 6 and 7 illustrate two different candidate message signalling charts for uplink data transmission procedures, shown in a longer time scale than FIG. 5. In order to realize the uplink packet scheduling in BS as shown in FIG. 5, UE informs the BS of the uplink data amount to be scheduled in the next uplink scheduling period. In these candidate examples, the uplink scheduling period is set to be several radio frames. For this uplink data indication from UE to BS, RRC message (e.g., a Capacity Request Message) and MAC control PDU (e.g., an Uplink Buffer Status Report) are used in FIGS. 6 and 7, respectively. Either one of these may be used in exemplary embodiments of this invention.

Figure 8A:
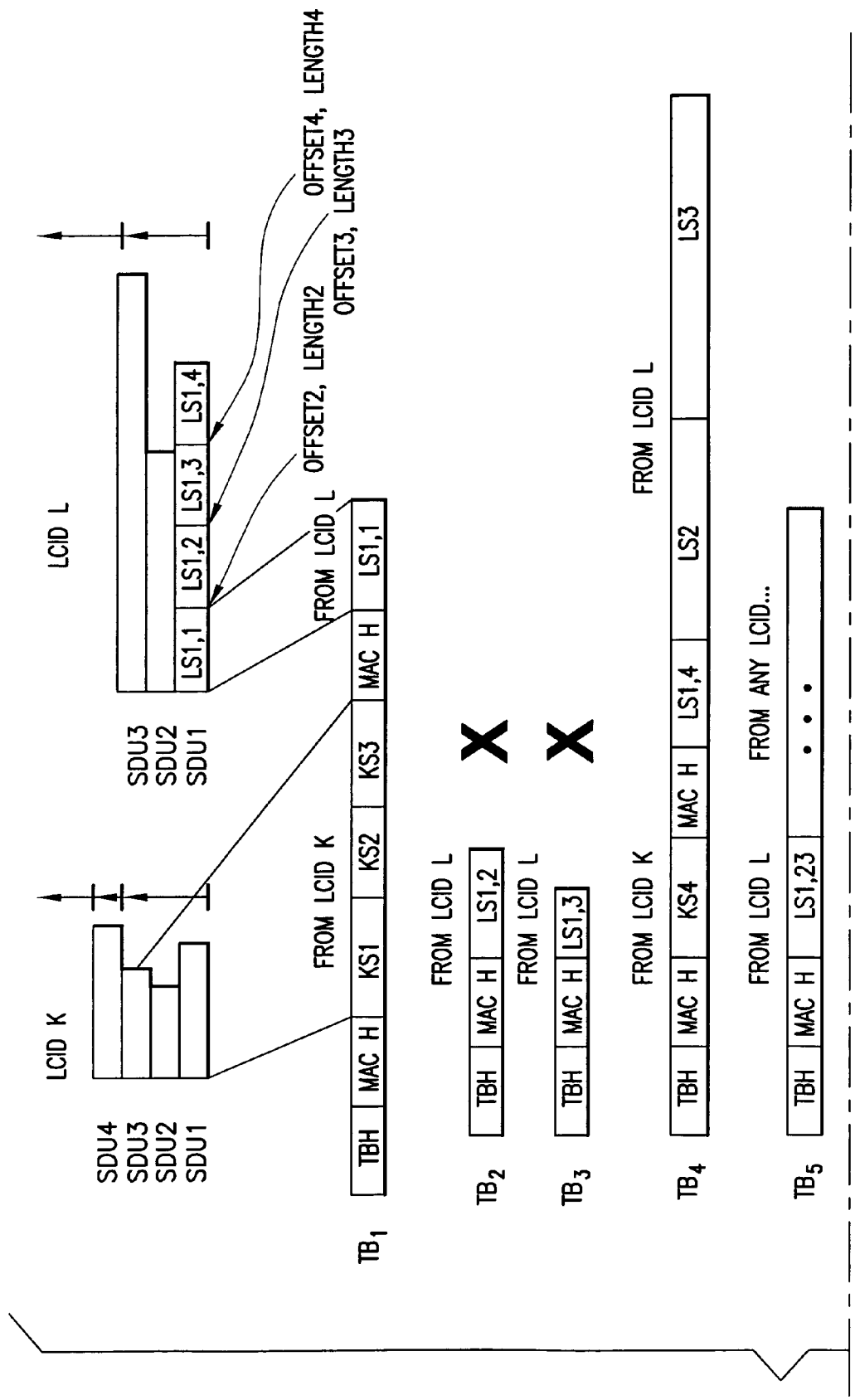
FIG. 8 represents an exemplary embodiment of the invention with a vector delivery arranged per logical channel.
Figures 8, 8B:
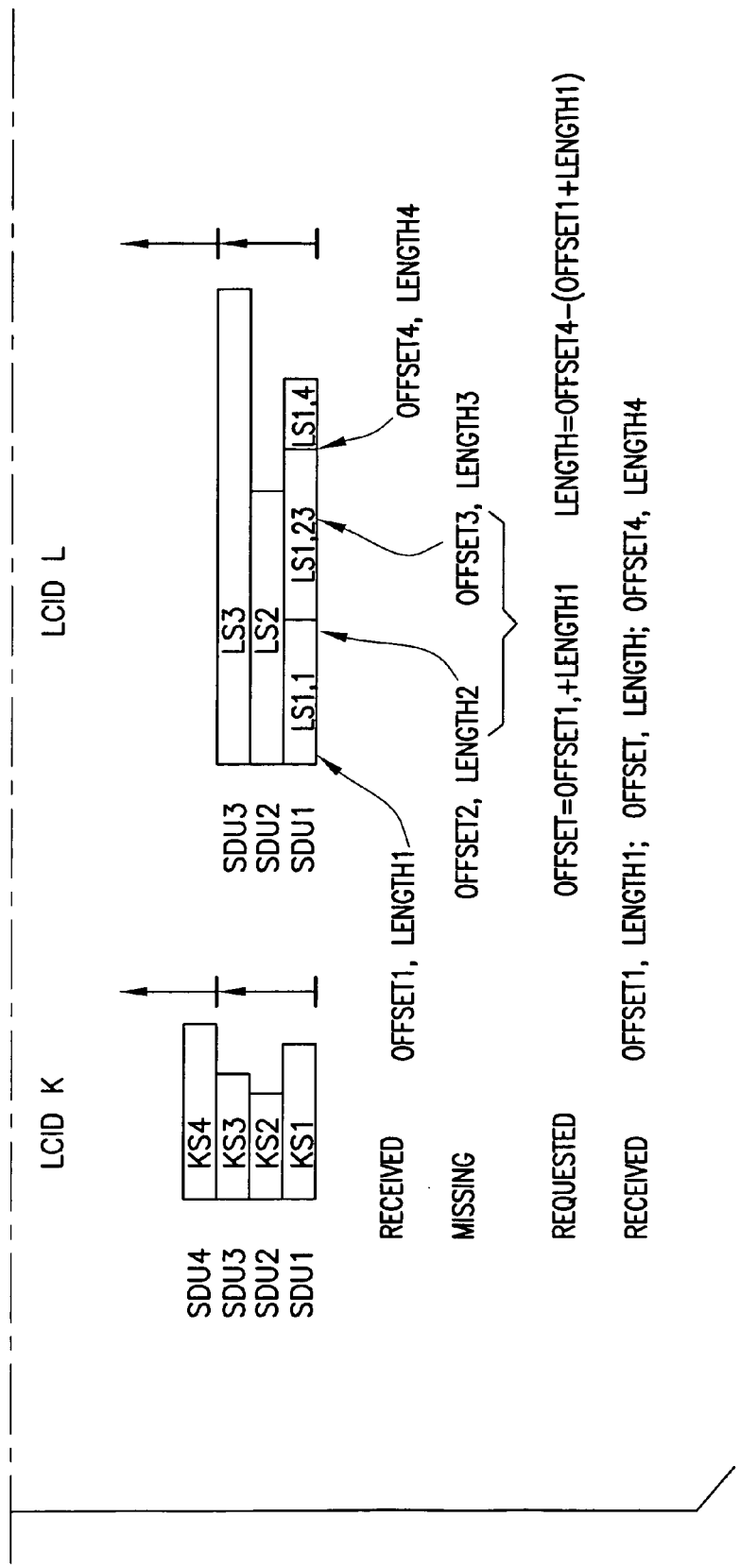

An overview of the flexible segmentation method, including the retransmissions, is shown in FIG. 8. This figure shows the invention with a vector delivery arranged per logical channel. "KSx,y" and "LSx,y" denote the y-th segment of the K-th logical channel of SDU number x and the y-th segment of the L-th logical channel of SDU number x, respectively. For different logical channels K and L, the SDU boundaries are taken into account. For the retransmission, the use of offset and length enables fully flexible segment sizes. The method employed favors transmission of complete SDUs, but it further allows for the segmentation of SDUs into any byte aligned size, which is decided at the transmission instant.

Thus, for any retransmission, the segment size may be freely changed. Included is an ARQ status report, which, in addition to a full SDU error bitmap, may announce the offset and length of the missing segments of partially received SDUS.

In FIG. 8, five TBs are depicted, numbered 1 through 5 (i.e., $TB_1$ through $TB_5$). Of the five TBs, $TB_2$ and $TB_3$ are not received. Hence, LS1,2 and LS1,3 (also referred to as LS1,23) are retransmitted in $TB_5$ in accordance with the exemplary embodiments of this invention.

Figure 9:
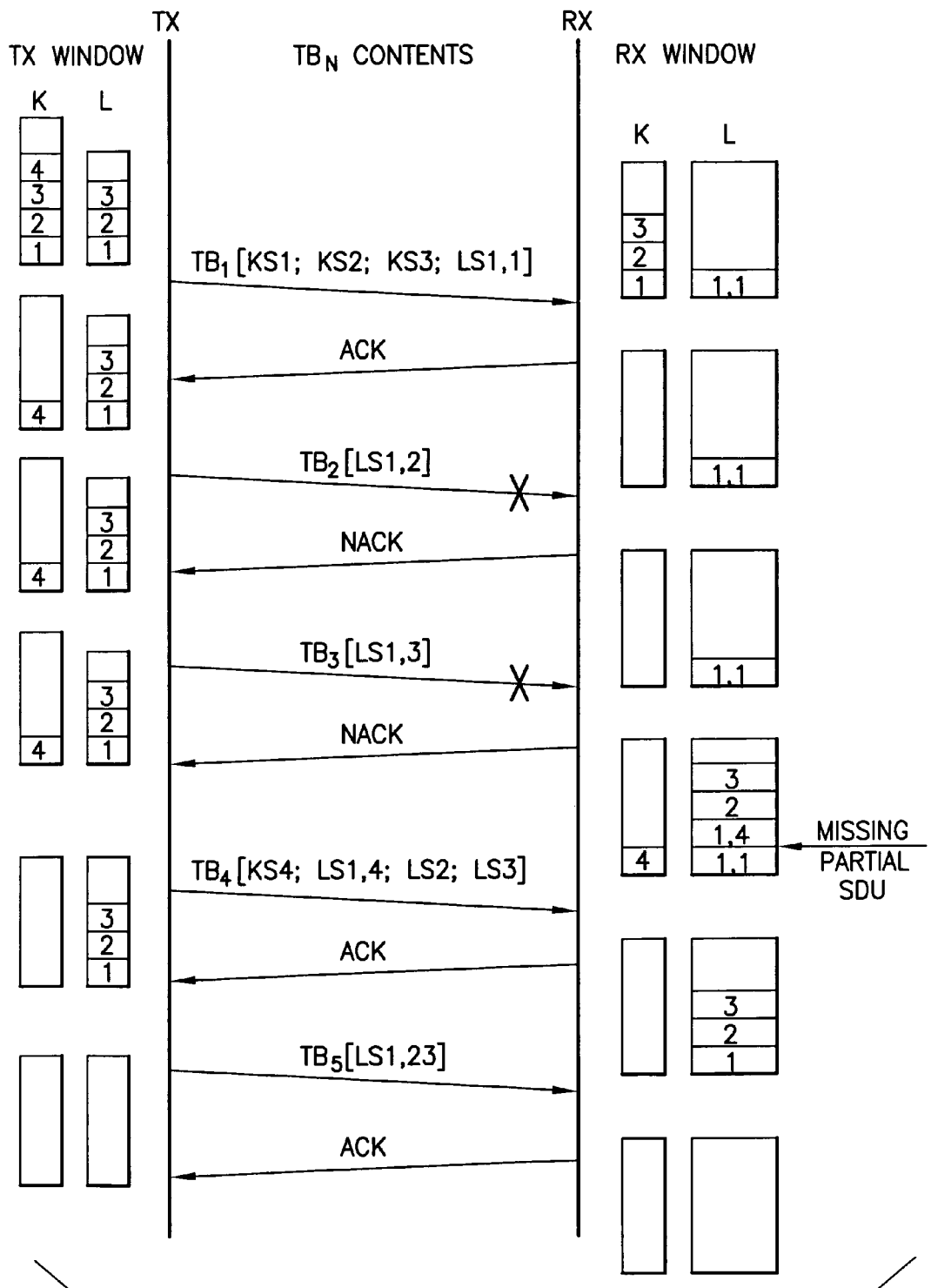
FIG. 9 shows a message sequence chart for an exemplary embodiment of the invention using the LCIDs and SDUs of FIG. 8.

FIG. 9 is a message sequence chart based on the LCIDS, SDUs and TBs of FIG. 8. Transmitter (TX) and receiver (RX) windows are shown with their respective contents as the transmissions progress. In accordance with exemplary embodiments of the invention, the receiver initially fails to receive partial SDUs LS1,2 and LS1,3 which are subsequently retransmitted in $TB_5$ as LS1,23. As stated above, the request for retransmission of SDUs LS1,23 may comprise an ARQ status report or a NACK, as non-limiting examples.

Figure 10:
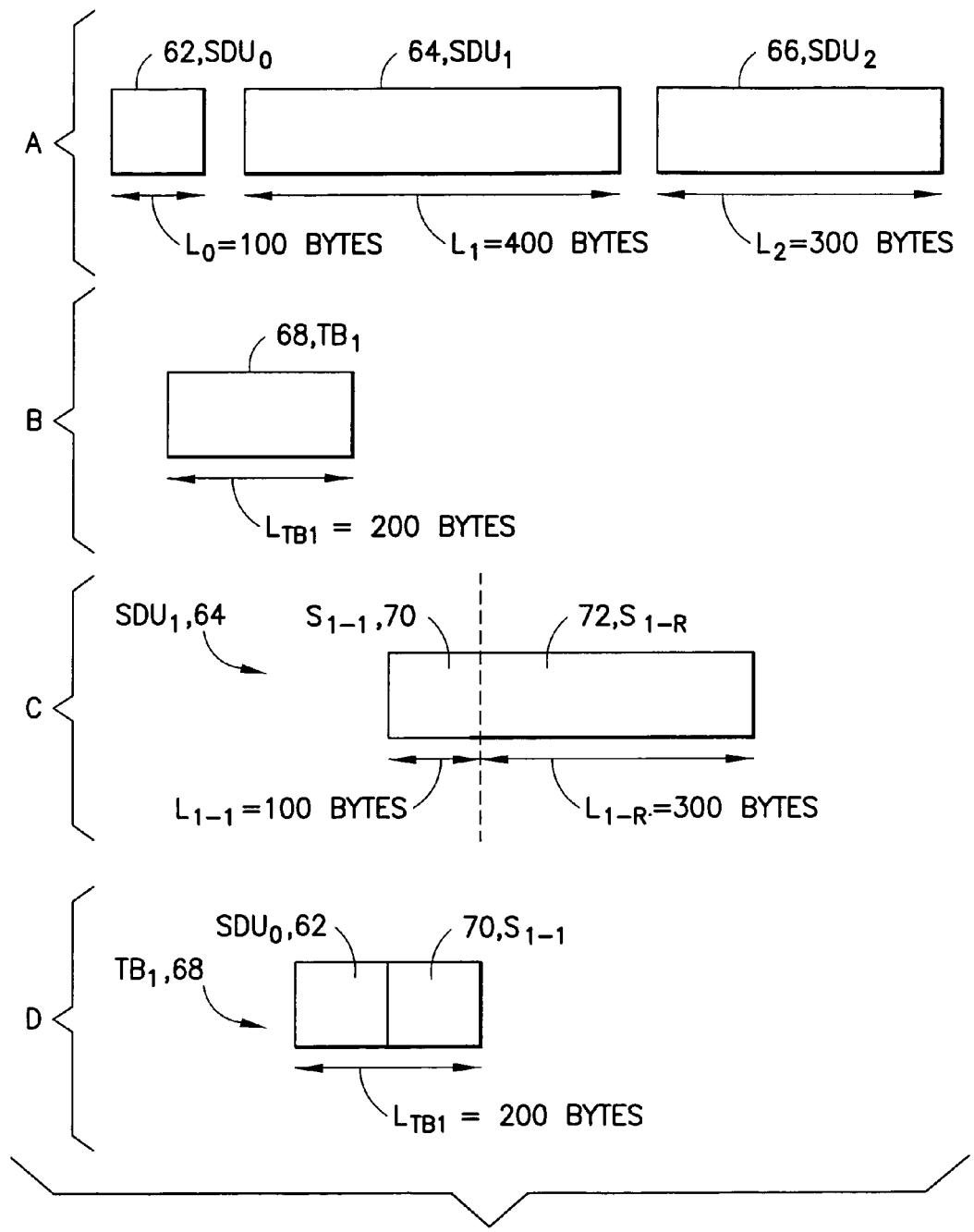
FIG. 10 illustrates an exemplary embodiment of the invention wherein a SDU is segmented based on a determined TB size.

FIG. 10 illustrates an exemplary embodiment of the invention wherein a SDU is segmented based on a determined TB size. In FIG. 10(A), three SDUs are shown, $SDU_0$ 62, $SDU_1$ 64 and $SDU_2$ 66, with each having a length $L_0$, $L_1$ and $L_2$, respectively. As indicated, $L_0$=100 bytes, $L_1$=400 bytes and $L_2$=300 bytes. The three SDUs 62, 64, 66 of FIG. 10(A) are to be transmitted.

In FIG. 10(B), the length ($L_{TB1}$) of a $TB_1$ 68 is determined based on criteria including the sizes $L_0$, $L_1$, $L_2$ of the SDUs 62, 64, 66. As a non-limiting example of this process, consider the following. It is desirable to transmit at least one complete SDU. Thus, the TB size preferably should be no less than 100 bytes (i.e., the TB preferably should be able to hold at least the smallest SDU, $SDU_0$ 62). However, due to scheduling and logical channel priorities, this communication link and SDUs, for this particular time and formation of a TB, has been allocated 200 bytes ($TB_1$ length $L_{TB1}$=200 bytes). Although shown in FIG. 10(B) for illustrative purposes, the TB, 68 has not actually been created (e.g., populated) yet.

Since it is desirable to transmit complete SDUs when possible, the TB, 68 will comprise $SDU_0$ 62. Thus, 100 bytes-worth of length remains to be filled, possibly by one or more segments of other SDUs, $SDU_1$ 64 and/or $SDU_2$ 66.

In FIG. 10(C), based on the above-stated preference of transmitting at least one complete SDU and further based on the determined $TB_1$ length $L_{TB1}$, an SDU, here $SDU_1$ 64, is segmented into a plurality of segments, segment 1-1 ($S_{1-1}$) 70 and segment 1-R ($S_{1-R}$) 72, each having a respective length of 100 bytes ($L_{1-1}$) and 300 bytes ($L_{1-R}$). The $SDU_1$ 64 is purposefully segmented to produce $S_{1-1}$ 70 having a length $L_{1-1}$ of 100 bytes such that $S_{1-1}$ 70 is of a suitably size to fill an available portion of the $TB_1$ 68, the available portion being the remaining portion of the $TB_1$ 68 after it has been populated with the $SDU_0$ 62. The remaining portion of the $SDU_1$ 64, namely the $S_{1-R}$ 72, can be transmitted, in whole or in part, in another TB. (See FIG. 11 and discussion thereof below.)

In FIG. 10(D), the $TB_1$ 68 is populated with the $SDU_0$ 62 and the $S_{1-1}$ 70. The $TB_1$ 68 may then be transmitted using the method and components discussed above in FIG. 3, as a non-limiting example.

As is apparent, the size $L_{TB1}$ of the $TB_1$ 68 is suitably determined by considering the lengths $L_0$, $L_1$, $L_2$ of the SDUs 62, 64, 66. Furthermore, the allocated size (200 bytes) of the $TB_1$ 68 is used efficiently by enabling the segmentation of an SDU (i.e., $SDU_1$ 64).

Figure 11:
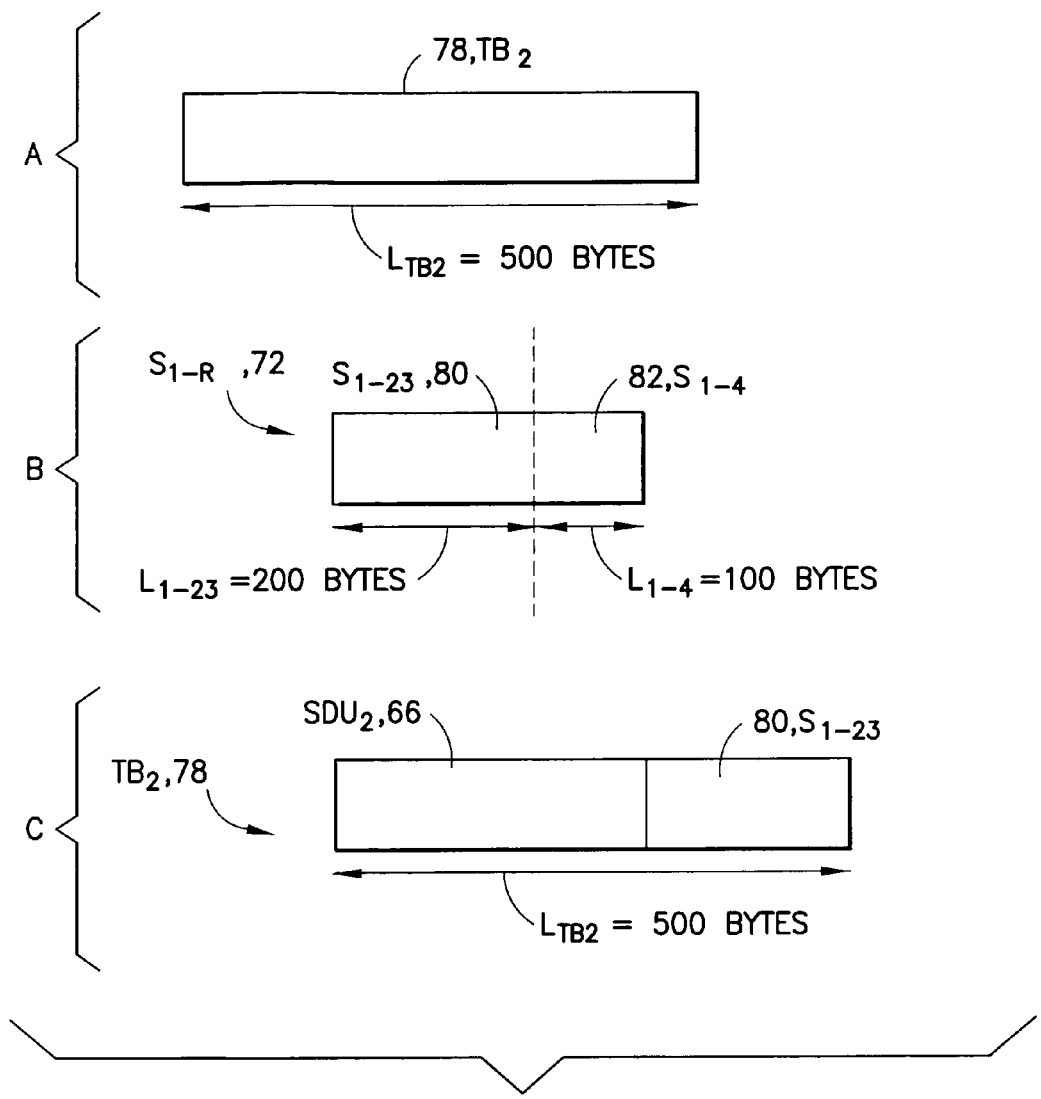
FIG. 11 illustrates a further implementation of the exemplary embodiment of FIG. 10 wherein the SDU is further segmented based on another determined TB size.

FIG. 11 illustrates a further implementation of the exemplary embodiment of FIG. 10 wherein the $SDU_1$ 64 is further segmented based on another determined TB size. In FIG. 11, a second TB ($TB_2$) 78 is configured and populated using the remaining SDUs 64, 66 or portions thereof from FIG. 10(A). The $TB_2$ 78 is subsequent to the transmission of the $TB_1$ 68 discussed in FIG. 10.

In FIG. 11(A), the length ($L_{TB2}$) of the $TB_2$ 78 is determined based on criteria including the sizes $L_{1-R}$, $L_2$ of the SDUs (or partial SDUS, i.e., segments) $S_{1-R}$ 72 and $SDU_2$ 66 that remain to be transmitted. As a further non-limiting example of this process, consider the following. It is desirable to transmit at least one complete SDU if any remain. Thus, the TB size preferably should be no less than 300 bytes (i.e., the TB preferably should be able to hold at least the smallest remaining SDU, $SDU_2$ 66). Due to scheduling and logical channel priorities having changed since the configuration and population of the first TB, $TB_1$ 68, this communication link and data, for this particular time and formation of a TB, has been allocated 500 bytes ($TB_2$ length $L_{TB2}$=500 bytes). Although shown in FIG. 11(A) for illustrative purposes, the $TB_2$ 78 has not actually been created (e.g., populated) yet.

Since it is desirable to transmit complete SDUs when possible, the $TB_2$ 78 will comprise $SDU_2$ 66. Thus, 200 bytes-worth of length remains to be filled, possibly by one or more segments of other SDUs (e.g., a segment of $S_{1-R}$ 72).

In FIG. 11(B), based on the above-stated preference of transmitting at least one complete SDU and further based on the determined $TB_2$ length $L_{TB2}$, a remaining portion of the $SDU_1$, $S_{1-R}$ 72, is re-segmented into a plurality of segments, segment 1-23 ($S_{1-23}$) 80 and segment 1-4 ($S_{1-4}$) 82, each having a respective length of 200 bytes ($L_{1-23}$) and 100 bytes ($L_{1-4}$). The remainder of the $SDU_1$ 64, $S_{1-R}$ 72, is purposefully segmented to produce $S_{1-23}$ 80 having a length $L_{1-23}$ of 200 bytes such that $S_{1-23}$ 80 is of a suitable size to fill an available portion of the $TB_2$ 78, the available portion being the remaining portion of the $TB_2$ 78 after it has been populated with the $SDU_2$ 66. The remaining portion of the $SDU_1$ 64 that has not been allocated to a TB, namely the $S_{1-4}$ 82, can be transmitted, in whole or in part, in another TB.

In FIG. 11(C), the $TB_2$ 78 is populated with the $SDU_2$ 66 and the $S_{1-23}$ 80. The $TB_2$ 78 may then be transmitted using the method and components discussed above in FIG. 3, as a non-limiting example.

As is apparent, the size $L_{TB2}$ of the $TB_2$ 78 is suitably determined by considering the lengths $L_{1-R}$ and $L_2$ of the remaining portions of SDUs ($S_{1-R}$ 72) and SDUs ($SDU_2$ 66). Furthermore, the allocated size (500 bytes) of the $TB_2$ 78 is used efficiently by enabling the further segmentation of a remaining portion of an SDU (i.e., the remaining portion of $SDU_1$ 64, the $S_{1-R}$ 72).

Although the exemplary SDUs and TBs of FIGS. 10 and 11 are described with respect to their respective lengths, any suitable size indication may be used. Furthermore, any suitable measurement scale and/or unit may be employed. Although the TBs of FIGS. 10 and 11 are shown as comprising only SDUs or portions thereof, TBs usually comprise additional, non-SDU portions, such as portions employed for signaling or identification purposes, as non-limiting examples.

The exemplary embodiments described in FIGS. 10 and 11 may also be utilized in conjunction with retransmission, should retransmission be necessary. Each transmitted segment would include a SSN, a length and an offset. If it were indicated that a segment should be retransmitted, the segment would be identifiable by its SSN, length and offset. In such a manner, only that specific portion of the SDU (i.e., the portion that comprises the identified segment) would have to be retransmitted. In such a manner, full retransmission of a complete SDU is unnecessary unless a TB was populated with the complete SDU in question.

A further non-limiting example of an exemplary electronic device suitable for use in conjunction with aspects of the exemplary embodiments of the invention is provided. The electronic device comprises: a data processor; and a transmitter coupled to the data processor. The transmitter is configured to transmit a retransmission notice indicating a segment of a plurality of segments. The retransmission notice comprises a request for retransmission of the indicated segment. The plurality of segments comprise a segmented data block. The retransmission notice comprises a data block identifier, a length value and an offset value of the indicated segment. The data block identifier comprises an identification of the segmented data block. The length value comprises a length of the indicated segment. The offset value comprises a boundary of the indicated segment as compared to the segmented data block. In other embodiments, the electronic device further comprises: a receiver coupled to the data processor. In further embodiments the electronic device comprises a mobile terminal. In other embodiments, the electronic device comprises a base station in an Evolved Universal Terrestrial Radio Access Network (E-UTRAN) system. In further embodiments, the electronic device may comprise any other aspect or component of the exemplary embodiments of the invention as described herein.

Figure 12:
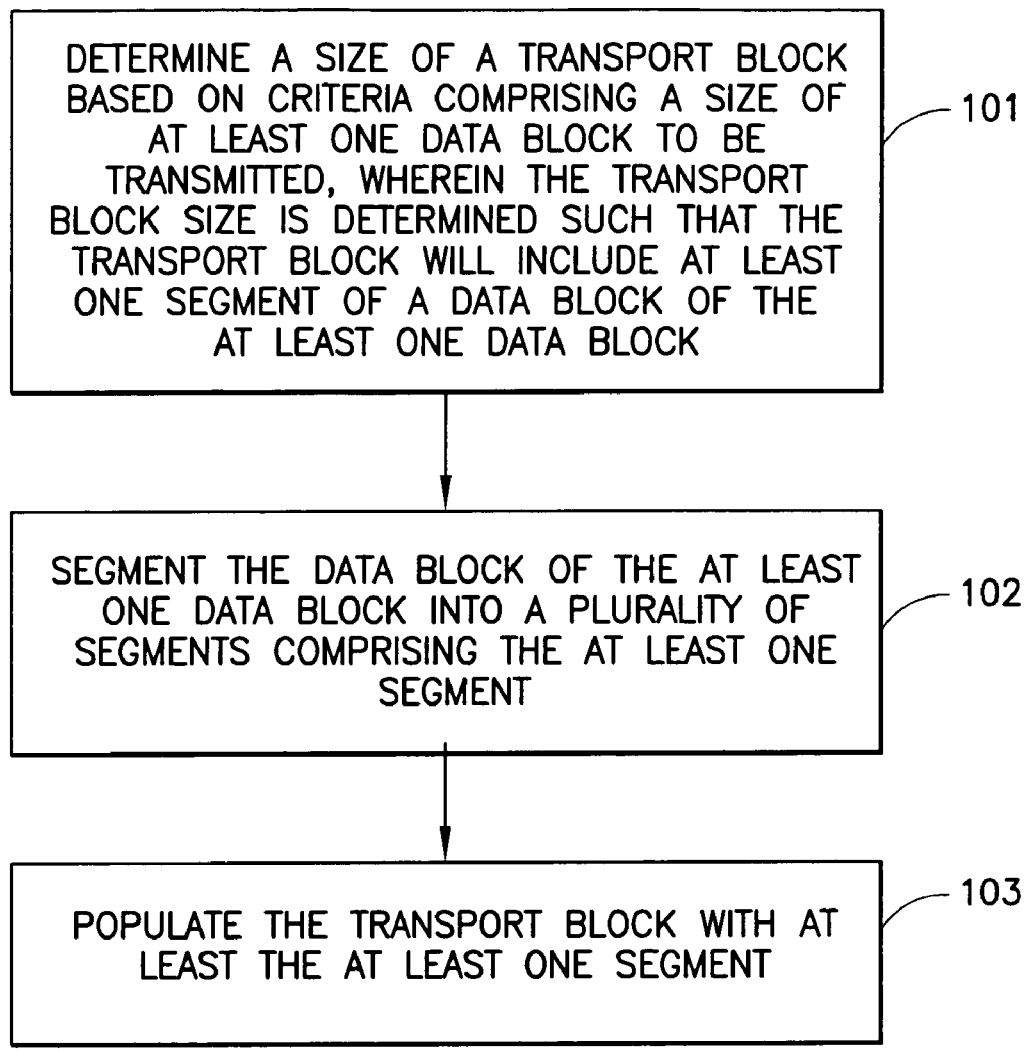
FIG. 12 depicts a flowchart illustrating one non-limiting example of a method for practicing the exemplary embodiments of this invention.

FIG. 12 depicts a flowchart illustrating one non-limiting example of a method for practicing the exemplary embodiments of this invention. The method includes the following steps. In box 101, a size of a transport block is determined based on criteria. The criteria comprises a size of at least one data block to be transmitted. The transport block size is determined such that the transport block will include at least one segment of a data block of the at least one data block. In box 102, the data block of the at least one data block is segmented into a plurality of segments comprising the at least one segment. In box 103, the transport block is populated with at least the at least one segment.

In other embodiments, the method further comprises transmitting the populated transport block. In further embodiments, the criteria further comprises multi-user scheduling and/or logical channel priorities. In other embodiments, the criteria further comprises at least one of: expected channel conditions of a plurality of radio links, an amount of data to be transmitted from each priority queue and a priority value of each terminal that is assigned a logical channel. In further embodiments, each segment of the plurality of segments comprises a data block identifier, a length value and an offset value, wherein the data block identifier comprises an identification of the segmented data block, wherein the length value comprises a length of the segment, wherein the offset value comprises a boundary of the segment as compared to the segmented data block.

In other embodiments, the method further comprises: in response to receiving a retransmission notice indicating a segment of the plurality of segments, retransmitting the segment, wherein the retransmission notice comprises the data block identifier, the length value and the offset value of the indicated segment. In further embodiments, determining the transport block size comprises calculating an amount of data to be transmitted for each priority queue based on a scheduling decision, wherein the retransmission notice comprises the amount of data to be transmitted for each priority queue.

In other embodiments, determining the transport block size comprises providing an amount of data to be transmitted for each priority queue and a size of at least one close data block, wherein the at least one close data block comprises at least one data block having a size relatively close to the amount of data to be transmitted for each priority queue, wherein the criteria further comprises the amount of data to be transmitted for each priority queue and the size of the at least one close data block, wherein the transport block size is determined such that the transport block comprises one of: whole data blocks, data blocks having minimal segmentation or a combination of whole data blocks and data blocks having minimal segmentation. In further embodiments, providing the amount of data to be transmitted for each priority queue comprises providing a vector comprising a minimum amount of data to be transmitted, wherein the sizes of the close data blocks comprise values relatively close to the minimum amount of data to be transmitted. In other embodiments, providing the amount of data to be transmitted for each priority queue and the size of the at least one close data block comprises using an interface.

In further embodiments, determining the transport block size comprises calculating an amount of data to be transmitted for each priority queue based on a scheduling decision. In other embodiments, the amount of data to be transmitted for each priority queue comprises a value relatively close to the size of each data block of the plurality of data blocks. In further embodiments, determining the transport block size further comprises providing a vector of the amount of data to be transmitted for each priority queue, wherein the vector comprises elements corresponding to each priority queue. In other embodiments, the method is utilized in conjunction with an Evolved Universal Terrestrial Radio Access Network (E-UTRAN) system.

Figure 13:
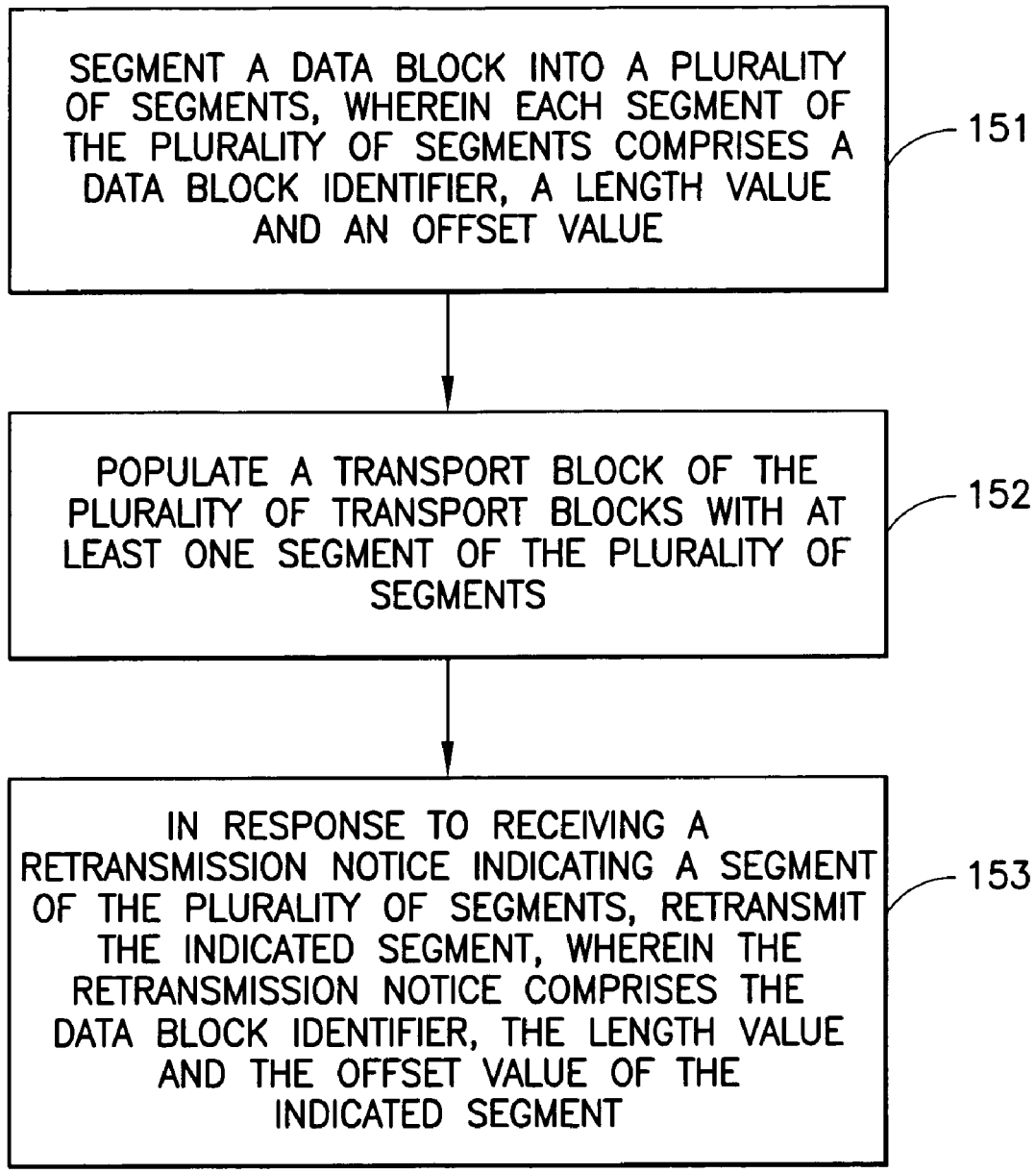
FIG. 13 depicts a flowchart illustrating another non-limiting example of a method for practicing the exemplary embodiments of this invention.

FIG. 13 depicts a flowchart illustrating another non-limiting example of a method for practicing the exemplary embodiments of this invention. The method includes the following steps. In box 151, a data block is segmented into a plurality of segments. Each segment of the plurality of segments comprises a data block identifier, a length value and an offset value. The data block identifier comprises an identification of the segmented data block. The length value comprises a length of the segment. The offset value comprises a boundary of the segment as compared to the segmented data block. The segmented data block is to be transported by a plurality of transport blocks. In box 152, a transport block of the plurality of transport blocks is populated with at least one segment of the plurality of segments. In box 153, in response to receiving a retransmission notice indicating a segment of the plurality of segments, the indicated segment is retransmitted. The retransmission notice comprises the data block identifier, the length value and the offset value of the indicated segment.

In other embodiments, the method further comprises transmitting the populated transport block. In further embodiments, the retransmission notice comprises an automatic repeat request (ARQ) status report. In other embodiments, the retransmission notice comprises a negative acknowledgement (NACK). In further embodiments, retransmitting the indicated segment comprises re-segmenting the indicated segment into smaller segments and applying at least one of a low order modulation, a low rate channel code and an increased diversity mode.

The exemplary, non-limiting methods shown in FIGS. 12 and 13 and discussed with respect thereto may be embodied as a computer program comprising program instructions embodied on a tangible computer-readable medium, execution of the program instructions resulting in operations comprising the steps of the method.

Embodiments of this invention are not limited to the protocol layers L1 (PHY) and L2 (MAC), as employed in the examples above. Rather, embodiments of this invention may be implemented for any protocol layer simply for performing segmentation efficiently for scheduling and resource allocation. The scheduler and allocation functions, as relating to the invention's segmentation process, may be included in different protocol layers having a defined interface or, alternatively, they may be included in the same protocol layer having no such specific interface. In addition, the scheduler and allocation functions may be included in different physical or logical processing units (or parts thereof) or they may be included into the same processing unit.

In one embodiment of this invention, the method described may be implemented for interfacing MAC segmentation with the scheduling and allocation functions of PHY. Hence, all labels of PHY/MAC/RRC, signaling flows, and primitives are employed as non-limiting examples. As apparent to one skilled in the art, such labels may be replaced by descriptions of any other relevant functional and/or protocol split. As a non-limiting example, segmentation, scheduling and allocation may take place in the same layer.

Although described above with respect to boundaries of SDUs, the exemplary embodiments of the invention may utilize any suitable size characteristic of the SDUs, such as length, as a non-limiting example. Furthermore, although discussed above with respect to an offset from the beginning of the SDU, the offset value may comprise any suitable value that indicates the placement of the segment with respect to the entire SDU. As a non-limiting example, the offset value could indicate re-numbering of segments as described above. As another non-limiting example, the offset value could indicate the boundary (i.e. end) of the segment that is nearest to the rear end of the SDU. In addition, although the exemplary embodiments have been discussed with respect to SDUs, the exemplary embodiments may be used in conjunction with the transport of any suitable collection of data (e.g., a data block).

Based on the foregoing, it should be apparent that the exemplary embodiments of this invention provide a method, apparatus, and computer program product(s) to improve the efficiency of segmentation by providing an intelligent TB size determination method and a flexible segmentation scheme for transmission.

While the exemplary embodiments have been described above in the context of an E-UTRAN system, it should be appreciated that the exemplary embodiments of this invention are not limited for use with only this one particular type of wireless communication system, and that they may be used to advantage in other wireless communication systems such as 3G high speed packet access (HSPA) evolution, wireless ad hoc networks, cognitive radios, beyond third generation (B3G) systems and fourth generation (4G) systems, as non-limiting examples. Such systems are expected to include techniques that allow for versatile methods of radio adaptation such as bandwidth adaptation, adaptation to spectral conditions, adaptation of radio capacity, adaptation of radio links and adaptation of transmission formats, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Various modifications and adaptations may become apparent to those skilled in the relevant arts in view of the foregoing description, when read in conjunction with the accompanying drawings and the appended claims. As but some examples, the use of other similar or equivalent data flows and transmission procedures may be attempted by those skilled in the art. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method comprising:
    determining a size of a transport block based on criteria comprising a size of at least one data block to be transmitted, wherein the transport block size is determined such that the transport block will include at least one segment of a data block of the at least one data block;
    after determining the size of the transport block, segmenting the data block of the at least one data block into a plurality of segments comprising the at least one segment, wherein each segment of the plurality of segments comprises a data block identifier, a length value field and an offset value field, wherein the data block identifier comprises an identification of the segmented data block, wherein a length value of the length value field indicates a length of the segment, wherein an offset value of the offset value field indicates a starting position of the segment relative to the segmented data block;
    populating the transport block with at least the at least one segment; and
    in response to receiving a retransmission notice indicating a segment of the plurality of segments, retransmitting the segment, wherein the retransmission notice comprises the data block identifier and the offset value of the indicated segment.

2. The method of claim 1, further comprising:
    transmitting the populated transport block via a wireless communication system.

3. The method of claim 1, wherein the criteria further comprises multi-user scheduling.

4. The method of claim 1, wherein the criteria further comprises logical channel priorities.

5. The method of claim 1, wherein the criteria further comprises at least one of:
    expected channel conditions of a plurality of radio links, an amount of data to be transmitted from each priority queue and a priority value of each terminal that is assigned a logical channel.

6. The method of claim 1, wherein the retransmission notice further comprises the length value.

7. The method of claim 6, wherein determining the transport block size comprises calculating an amount of data to be transmitted for each priority queue based on a scheduling decision, wherein the retransmission notice comprises the amount of data to be transmitted for each priority queue.

8. The method of claim 1, wherein determining the transport block size comprises providing an amount of data to be transmitted for each priority queue and a size of at least one certain data block, wherein the at least one certain data block comprises at least one data block having a size approximating the amount of data to be transmitted for each priority queue, wherein the criteria further comprises the amount of data to be transmitted for each priority queue and the size of the at least one certain data block, wherein the transport block size is determined such that the transport block comprises one of: whole data blocks, data blocks having minimal segmentation or a combination of whole data blocks and data blocks having minimal segmentation.

9. The method of claim 8, wherein providing the amount of data to be transmitted for each priority queue comprises providing a vector comprising a minimum amount of data to be transmitted, wherein the sizes of the certain data blocks comprise values approximating the minimum amount of data to be transmitted.

10. The method of claim 8, wherein providing the amount of data to be transmitted for each priority queue and the size of the at least one certain data block comprises using an interface.

11. The method of claim 1, wherein determining the transport block size comprises calculating an amount of data to be transmitted for each priority queue based on a scheduling decision.

12. The method of claim 11, wherein the amount of data to be transmitted for each priority queue comprises a value approximating the size of each data block of the plurality of data blocks.

13. The method of claim 11, wherein determining the transport block size further comprises providing a vector of the amount of data to be transmitted for each priority queue, wherein the vector comprises elements corresponding to each priority queue.

14. A non-transitory computer-readable medium tangibly embodying program instructions, execution of the program instructions resulting in operations comprising:
    determining a size of a transport block based on criteria comprising a size of at least one data block to be transmitted, wherein the transport block size is determined such that the transport block will include at least one segment of a data block of the at least one data block;
    after determining the size of the transport block, segmenting the data block of the at least one data block into a plurality of segments comprising the at least one segment, wherein each segment of the plurality of segments comprises a data block identifier, a length value field and an offset value field, wherein the data block identifier comprises an identification of the segmented data block, wherein a length value of the length value field indicates a length of the segment, wherein an offset value of the offset value field indicates a starting position of the segment relative to the segmented data block;
    populating the transport block with at least the at least one segment; and
    in response to receiving a retransmission notice indicating a segment of the plurality of segments, retransmitting the segment, wherein the retransmission notice comprises the data block identifier and the offset value of the indicated segment.

15. The computer-readable medium of claim 14, execution of the program instructions resulting in operations further comprising:

transmitting the populated transport block via a wireless communication system.

16. The computer-readable medium of claim 14, wherein determining the transport block size comprises providing an amount of data to be transmitted for each priority queue and a size of at least one certain data block, wherein the at least one certain data block comprises at least one data block having a size approximating the amount of data to be transmitted for each priority queue, wherein the criteria further comprises the amount of data to be transmitted for each priority queue and the size of the at least one certain data block, wherein the transport block size is determined such that the transport block comprises one of: whole data blocks, data blocks having minimal segmentation or a combination of whole data blocks and data blocks having minimal segmentation.

17. The method of claim 1, wherein the retransmission notice comprises one of an automatic repeat request (ARQ) status report or a negative acknowledgement (NACK).

18. The method of claim 1, wherein retransmitting the indicated segment comprises re-segmenting the indicated segment into smaller segments and applying at least one of a low order modulation, a low rate channel code and an increased diversity mode.

19. The computer-readable medium of claim 14, wherein the retransmission notice comprises one of an automatic repeat request (ARQ) status report or a negative acknowledgement (NACK).

20. An apparatus comprising:
a data processor; and
a memory storing computer program instructions,
wherein the memory and the computer program instructions are configured to, with the data processor, cause the apparatus to perform operations comprising:
determining a size of a transport block based on criteria comprising a size of at least one data block to be transmitted, wherein the transport block size is determined such that the transport block will include at least one segment of the data block;
after determining the size of the transport block, segmenting the data block into a plurality of segments comprising the at least one segment, wherein each segment of the plurality of segments comprises a data block identifier, a length value field and an offset value field, wherein the data block identifier comprises an identification of the segmented data block, wherein a length value of the length value field indicates a length of the segment, wherein an offset value of the offset value field indicates a starting position of the segment relative to the segmented data block;
populating the transport block with at least the at least one segment; and
in response to receiving a retransmission notice indicating a segment of the plurality of segments, retransmitting the segment, wherein the retransmission notice comprises the data block identifier and the offset value of the indicated segment.

21. The apparatus of claim 20, further comprising:
a transmitter coupled to the data processor, wherein the transmitter is configured to transmit the transport block via a wireless communication system.

22. The apparatus of claim 20, wherein the retransmission notice further comprises the length value.

23. The apparatus of claim 20, wherein the apparatus comprises an access node of a wireless communication network.

24. The method of claim 2, wherein the wireless communication system comprises a cellular communication system.

25. The method of claim 2, wherein the wireless communication system comprises a terrestrial radio system.

26. The method of claim 2, wherein the transport block comprises a radio transport block.

* * * * *